F. VAN PATTEN.

Whiffletree.

No 61,776.　　　　　　　　　　　Patented Feb. 5, 1867.

Witnesses　　　　　　　　　　　Inventor:

United States Patent Office.

FREDERICK VAN PATTEN, OF AUBURN, NEW YORK.

Letters Patent No. 61,776, dated February 5, 1867.

IMPROVEMENT IN "FIFTH-WHEEL" OR WHIFFLE-TREE ATTACHMENT FOR CARRIAGES.

*The Schedule referred to in these Letters Patent and making part of the same.*

TO ALL WHOM IT MAY CONCERN:

Be it known that I, FREDERICK VAN PATTEN, of Auburn, in the county of Cayuga, and State of New York, have invented certain new and useful Improvements in a Fifth-Wheel or Whiffle-tree Connection or Attachment for Carriages, and that the following is a full, clear, and exact description of the same, reference being had to the accompanying drawings, making a part of this specification, in which—

Similar letters of reference, where they occur in the separate figures, denote like parts in all the drawings.

My invention consists in a fifth-wheel or whiffle-tree connection that will turn freely but cannot part or separate, and composed of an under plate having a flanged sleeve upon it, and a sectional upper plate with half collars to surround the neck of the sleeve or hub, both plates being secured to their respective parts by screws, so as to be readily placed, removed, and replaced, as occasion may require.

To enable others skilled in the art to make and use my invention, I will proceed to describe the same with reference to the drawings.

Figure 1:
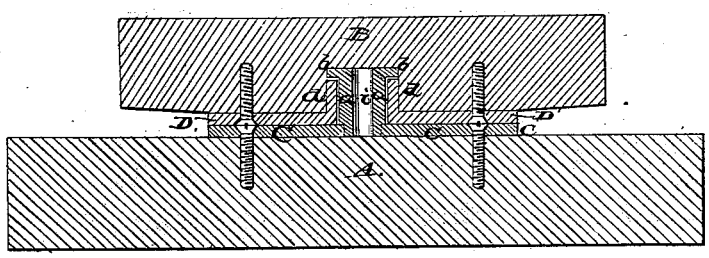
Figure 1 represents a section through a portion of an axle-tree and perch to show the connection.
Figure 2:
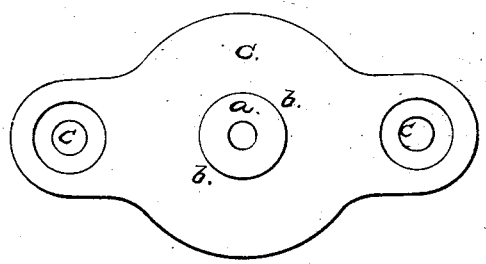
Figure 2 represents a top view of the under plate of coupling or connection.
Figure 3:
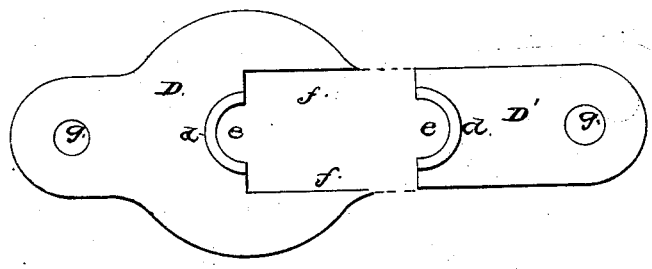
Figure 3 represents similar views of the upper plates thereof.

A may represent an axle or cross-bar, and B a perch or whiffle-tree, the two connected by my coupling plates, as shown in the section, fig. 1. The plates are made as follows: C is the under plate, having a hub, $a$, rising from it, the top of which has a flange or rim, $b$, upon it. In this plate are screw-holes, $c\ c$, to secure it to the axle or cross-bar A. The upper plate is composed of two sections, D D'. The one, D, has a half collar, $d$, surrounding a circular opening, $e$, in it, and an opening, $f$, that will receive the other section, D', in it. The section D has also a half collar, $d$, upon it, which surrounds a circular opening, $e$, in it, as in the other section. When the plate D is slipped up against the neck $a$ and the plate D' slipped into the opening $f$ of the plate D and against the neck $a$, the two half collars completely surround the neck $a$ under the flange $b$. And when screws are inserted through the holes $g\ g$ into the piece B, the two pieces A B are inseparably connected together, while they are free to turn one upon the other. The perch or whiffle-tree B has a hole bored into it to receive the hub and collar of the under and upper plate and allow the two plates to bear and turn upon each other. In some couplings or connections the upper and under plates may be reversed and an opening, $i$, made through the hub to receive a bolt or other through fastening.

Having thus fully described my invention, what I claim as new, and desire to secure by Letters Patent, is—

A fifth-wheel or whiffle-tree connection for carriages, composed of plates C D D', with the hub and collars, constructed and operating substantially as and for the purpose described.

FREDERICK VAN PATTEN.

Witnesses:
   ISRAEL SHOEMAKERY,
   A. R. REYNOLDS.